Aug. 19, 1969     E. MANCUSO     3,462,147

SECTIONAL BILLIARD CUE WITH EASY DETACHMENT FEATURE

Filed Aug. 17, 1967

INVENTOR,
EMANUEL MANCUSO

BY
Julian Brown
ATTORNEY

United States Patent Office 3,462,147
Patented Aug. 19, 1969

3,462,147
SECTIONAL BILLIARD CUE WITH EASY
DETACHMENT FEATURE
Emanuel Mancuso, 3516 W. Alameda St.,
Burbank, Calif. 91505
Filed Aug. 17, 1967, Ser. No. 661,435
Int. Cl. A63d 15/08
U.S. Cl. 273—68
2 Claims

ABSTRACT OF THE DISCLOSURE

A billiard cue comprising a handle and a shaft joined by a connector. The connector includes a fitting having a socket provided with equally spaced apart threaded sectors secured to the shaft while the handle is provided with a stud having equidistantly spaced apart threaded sectors adapted to connect with the threaded sectors of the socket fitting on the shaft when the handle is turned relative to the shaft. A spring within the socket of the shaft fitting engages the end of the stud of the handle fitting to normally urge the two fittings to separate when the threaded sectors are disengaged.

---

An object of the invention is the provision of a billiard cue in which the shaft and handle form separate members which are readily connected or disconnected from each other, the connection being positive and permitting handles of different weights to be connected with the shaft.

With respect to the foregoing object it may be mentioned that billiard cues are of different weights, varying usually between 16 oz. to 22 oz. In place of providing several billiard cues having different weights, the present device allows a change in handle weight for use with a given weight shaft in accordance with the player's preference.

A further object is the provision of a billiard cue and a connector for axially joining the shaft with the handle thereof so formed that separation therebetween occurs when the handle is turned a slight amount relative to the shaft.

With respect to the foregoing object, the billiard cue includes a shaft and a handle adapted to be in axial alignment and secured together by means of a connector so constructed and arranged that a slight turning of the handle will either lock or unlock the connector together with resilient means for said connector which urges separation between the shaft and the handle when index marks carried by the connector for the shaft and the handle are in alignment.

Other objects of the invention will appear as the specification proceeds, among which objects are inexpensiveness of construction, maintenance of cue balance, superiority over known billiard cue construction, and assurance against breakage under normal use of the billiard cue.

Figure 1:
FIGURE 1 is a side elevation of the billiard cue, the shaft and handle being connected together.
Figure 2:
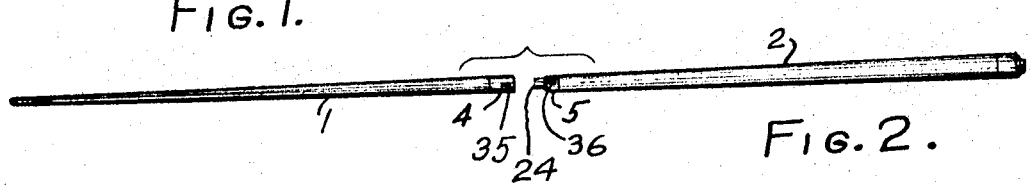
FIGURE 2 is similar to that of FIGURE 1 with the handle and the shaft separated.
Figure 3:
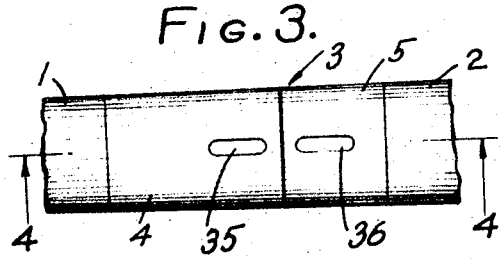
FIGURE 3 is a fragmentary, enlarged view of the connector portion between the shaft and the handle.
Figure 5:
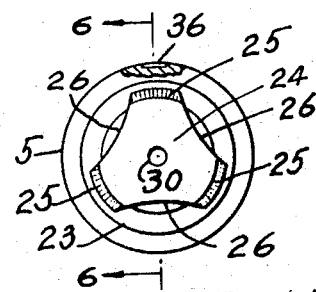
FIGURE 5 is a partially sectional view, on an enlarged scale, looking in the direction of the arrow 5 of FIGURE 4.
Figure 4:
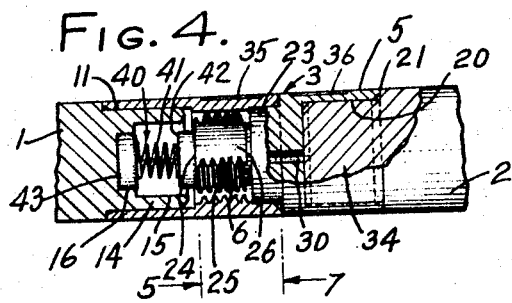
FIGURE 4 is a fragmentary, partially sectional view on the line 4—4 of FIGURE 3.
Figure 6:
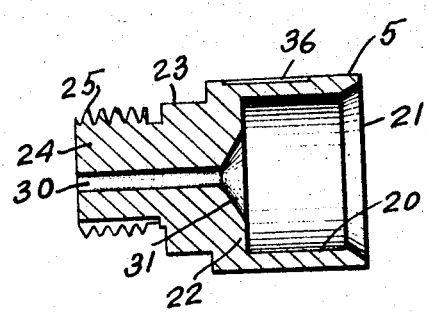
FIGURE 6 is an enlarged sectional view on the line 6—6 of FIGURE 5.
Figure 7:
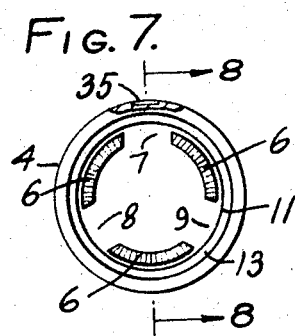
FIGURE 7 is an enlarged view, partly in section, looking in the direction of the arrow 7 of FIGURE 4.
Figure 8:
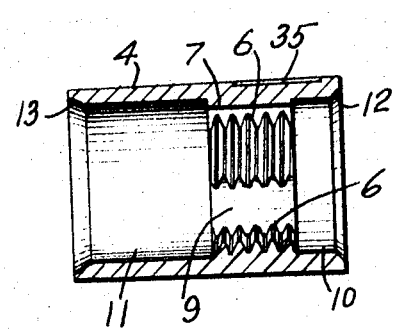
FIGURE 8 is a sectional view on an enlarged scale, on the line 8—8 of FIGURE 7.
Figure 9:
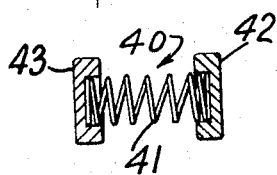
FIGURE 9 is a sectional view of spring means utilized in the connector for the shaft and the handle for urging separation thereof.

Referring to the drawing, the billiard cue includes a shaft 1 and a handle 2 with contiguous ends thereof secured by a connector 3. The connector 3 has two fittings or sections 4 and 5. The fitting 4 is secured to one end of the shaft 1 while fitting 5 is secured to an end of the handle 2. In cue construction the shaft and the handle gradually taper throughout their combined lengths as shown in FIGURES 1 and 2 and the connector is so formed as to preserve the taper therebetween, as shown in FIGURES 3 and 4. Usually the cue is of a standard weight while the handle portion varies in weight, usually from 16 to 22 ounces. As has been heretofore pointed out, different weights of handles in present known billiard cues require many complete cues whereas with the present invention a cue may be used having a single shaft for connection with different weight handles. The connector fitting 4 is tubular in form and internally provided with spaced apart threaded sectors 6 having the same degree of arc. As shown in FIGURE 7, and for illustrative purposes only, there are three threaded sectors 6 and ways are provided between adjacent sectors, as shown at 7, 8 and 9. The degree of arc for the ways may be less than the degree of arc for each threaded sector, as shown in FIGURE 7. As stated, the threaded sector portions 6 are spaced inwardly from each end of the fitting 4, as shown in FIGURE 8. The spacing of the sectors from ends of the fitting provides a shallow tubular portion at 10 and a greater depth portion at 11. The ends of the fitting are chamfered at 12 and 13. One end of the shaft 1 is reduced in external diameter at 14, which portion is axially bored at 15 and counterbored at 16. The portion 14 is received within the portion 11 of the fitting 4. However, the end of portion 14 does not contact the ends of threaded sector portions 6, as shown in FIGURE 4.

The fitting 5 is bored inwardly from one end to provide a collar or sleeve portion 20 having an open end at 21, a base member 22, a reduced diameter enlargement 23 extending outwardly from the base member and with a stud 24 projecting from enlargement 23. The stud 24 is provided with three, in the present instance, externally threaded sectors 25 equidistantly spaced apart with grooves designated generally as 26 between adjacent sectors. The degree of arc for each threaded sector 25 is such as to permit its insertion in the wave 7, 8, and 9 between the threaded sectors 6, of fitting 4. The stud 24 and portions 22 and 23 are bored at 30. The bore 30 is preferably of uniform diameter and provided with a conical bore 31 communicating with the interior of the sleeve portion 20. The fitting 5 has the sleeve portion 20 thereof positioned on a reduced end portion 34 of the handle 2. The bore 30 allows air to escape forwardly of the handle when it is secured to the fitting 5. Both fittings are provided with index marks 35 and 36 which when aligned, as shown in FIGURE 3, allows insertion of the stud 24 into fitting 4. That is to say, the threaded sectors 25 of fitting 5 will be received in the ways 7, 8 and 9 when the index marks 35 and 36 are in alignment whereupon the handle carrying fitting 5 may be rotated relative to shaft 1 and fitting 4 to cause engagement of the threaded sectors 25 with the threaded sectors 6 of fitting 4. The enlargement 23 is received within tubular portion 10, but does not engage ends of sectors 6. To assist in sector co-engagement and disengagement of the fittings of the connector, means 40 is provided. The means 40 includes a compression spring 41 provided at its ends with cups 42 and 43. The cups are provided with blind bores for receiving each end of the spring 41. One cup 43 is received within the counterbore 16 of the shaft with the spring and the cup 42 extended outwardly for engagement with the end of the stud 24, as shown in FIGURE 4. Thus when the threads of the fittings 4 and 5 co-engage the spring 41 is in compression and a turning of one fitting relative to the other by either turning the handle or the shaft to disengage the fittings, permits the spring 41 to expand and to move the fittings apart. This action is desirable when the fittings are to be unlocked as it does not require any back-up on the threads to release the sectors. Thus, when the two fittings have the index marks in alignment, as shown in FIGURE 3, and one fitting is rotated relative to the other, the sector threads of said fittings will co-engage under compression of the spring 41 to maintain the threaded engagement. When it is desired to separate the fittings of the connector, the index marks 35 and 36 are again aligned and the spring expands to move the fittings apart.

The operation, uses and advantages of the invention are as follows.

Preferably Acme threads are utilized for the sectors of the fittings of the connector. A small thread pitch is desirable so that the threaded sectors may readily interconnect or disconnect. In addition to allowing handles of different weights to be secured to one shaft, the device also permits ready transportation and storage by the separation of the parts. As all parts of the connector are symmetrical, the cue is always in balance and, therefore, does not interfere with the proper playing of a billiard game.

I claim:

1. A billiard cue, including: a handle, a shaft and means detachably interconnecting the handle and the shaft; said means comprising fittings carried by one end of the shaft and by one end of the handle, the fitting for the shaft being formed with a socket, the interior of the fitting in the socket being provided with threaded sectors equidistantly arcuately spaced apart, and the fitting for the handle provided with a stud having equidistantly arcuately spaced apart external threaded sectors, the stud adapted for reception in the socket, the threaded sectors of both fittings co-engaging when the handle and the shaft are relatively turned, and a compression spring provided at each end with cups carried by the shaft, one cup adapted to engage an end of the stud of the fitting for the handle, to normally push the stud outwardly from the socket fitting of the shaft when the threads of the sectors are disengaged.

2. A billiard cue, including: a handle, a shaft and a connector for joining the handle to the shaft in axial alignment; said connector comprising two fittings one carried by the shaft and the other by the handle; the fitting for the shaft having a socket portion internally provided with spaced apart threaded sectors, and the fitting for the handle provided with a stud externally provided with spaced apart threaded sectors, the spacing between the threaded sectors of both fittings providing ways whereby the threaded sectors of the fitting for the handle may enter the socket of the fitting for the shaft through the ways in said fitting and a turning of the handle relative to the shaft effecting co-engagement of the sector threads of the fittings, and a compression spring within the fitting for the shaft normally engaging an end of the stud to impose pressure between the fittings to align and the threads of the sectors for co-engagement.

References Cited

UNITED STATES PATENTS

| 664,528 | 12/1900 | Brauers | 273—68 |
| 796,802 | 8/1905 | Brown | 273—80.1 |
| 1,565,070 | 12/1925 | Edwards | 273—80 X |
| 3,060,787 | 10/1962 | Kraus et al. | 287—125 X |

FOREIGN PATENTS

| 564,528 | 10/1944 | Great Britain. |

RICHARD C. PINKHAM, Primary Examiner

R. J. APLEY, Assistant Examiner

U.S. Cl. X.R.

287—125